United States Patent
Izutani (10) Patent No.: US 8,252,473 B2
(45) Date of Patent: Aug. 28, 2012

(54) FUEL CELL-EQUIPPED VEHICLE AND CONTROL METHOD FOR FUEL CELL-EQUIPPED VEHICLE

(75) Inventor: Takahide Izutani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 324 days.

(21) Appl. No.: 12/678,002

(22) PCT Filed: Sep. 17, 2008

(86) PCT No.: PCT/IB2008/002423
§ 371 (c)(1),
(2), (4) Date: Mar. 12, 2010

(87) PCT Pub. No.: WO2009/037549
PCT Pub. Date: Mar. 26, 2009

(65) Prior Publication Data
US 2010/0212979 A1    Aug. 26, 2010

(30) Foreign Application Priority Data
Sep. 18, 2007 (JP) ................................ 2007-241233

(51) Int. Cl.
*H01M 8/04* (2006.01)

(52) U.S. Cl. ...... 429/450; 429/414; 429/427; 180/65.31

(58) Field of Classification Search ............. 429/450, 429/414, 413, 443, 428, 427; 180/65.31
See application file for complete search history.

(56) References Cited

U.S. PATENT DOCUMENTS

| | | | |
|---|---|---|---|
| 2003/0037983 A1* | 2/2003 | Hanaya et al. | 180/309 |
| 2004/0258973 A1* | 12/2004 | Grasso et al. | 429/32 |
| 2006/0040160 A1* | 2/2006 | Horii et al. | 429/34 |
| 2006/0068240 A1 | 3/2006 | Matoba | |
| 2007/0000702 A1 | 1/2007 | Yoshida et al. | |

FOREIGN PATENT DOCUMENTS

| | | |
|---|---|---|
| EP | 1 401 041 A2 | 3/2004 |
| JP | A 11-353581 | 12/1999 |
| JP | A 2005-153853 | 6/2005 |
| JP | A 2006-141154 | 6/2006 |
| JP | A 2006-185616 | 7/2006 |

OTHER PUBLICATIONS

International Search Report issued for International Application No. PCT/IB2008/002423 on May 29, 2009.
Written Opinion issued for International Application No. PCT/IB2008/002423 on May 29, 2009.

* cited by examiner

*Primary Examiner* — Raymond Alejandro
(74) *Attorney, Agent, or Firm* — Oliff & Berridge, PLC (57) ABSTRACT

A vehicle equipped with a fuel cell recognizes an external characteristic of a following mobile unit. Corresponding to the recognized characteristic, the vehicle controls the permission, the amount and the prohibition of discharge of the water produced along with electricity generation of the fuel cell.

19 Claims, 7 Drawing Sheets

FUEL CELL-EQUIPPED VEHICLE AND CONTROL METHOD FOR FUEL CELL-EQUIPPED VEHICLE

BACKGROUND OF THE INVENTION

1. Field of the Invention

The invention relates to a fuel cell-equipped vehicle and a control method for a fuel cell-equipped vehicle.

2. Description of the Related Art

A fuel cell produces water along with electricity generation. Therefore, in the case where a fuel cell is mounted in a vehicle, the produced water needs to be dealt with. In the case where the produced water is released outside, there is a need to restrain a drawback of the water landing on the surrounding objects. Therefore, various proposals have been made as described in Japanese Patent Application Publication No. 2005-153853 (JP-A-2005-153853), Japanese Patent Application Publication No. 2006-185616 (JP-A-2006-185616), and Japanese Patent Application Publication No. 2006-141154 (JP-A-2006-141154). For example, JP-A-2005-153853 describes a fuel cell vehicle in which the amount of discharged water is controlled according to the speed of the vehicle or the inter-vehicle distance to the following vehicle.

However, the determination based on the inter-vehicle distance or the vehicle speed sometimes fails to give an appropriate result of determination as to whether the discharging of water is allowed or the allowable amount of water to be discharged, depending on a relation with the following vehicle. Therefore, there is a risk of prohibiting water discharging when it is actually possible or, conversely discharging water when water discharging needs to be prohibited.

SUMMARY OF THE INVENTION

This invention provides a fuel cell-equipped vehicle and a control method for a fuel cell-equipped vehicle capable of performing an appropriate water discharging control in relation with a mobile unit that follows the vehicle.

A first aspect of the invention relates to a fuel cell-equipped vehicle that includes: a fuel cell; water discharging means for discharging water produced along with electricity generation of the fuel cell; follower recognizing means for recognizing a following mobile unit; and drain controlling means for controlling amount of water discharged according to the result of recognition of the following mobile unit.

According to the foregoing aspect, the water discharging can be appropriately performed corresponding to the result of recognition of the following mobile unit.

In the foregoing aspect, the follower recognizing means may estimate a height of a specific site of the following mobile unit, and the drain controlling means may decrease the amount of water discharged as the lower the height of the specific site is.

In the foregoing aspect, the drain controlling means may prohibit the water discharging if the height of the specific site is less than or equal to a predetermined value.

In the foregoing aspect, the drain controlling means may discontinue the control of the amount of water discharging if the height of the specific site is greater than or equal to a predetermined value.

According to the foregoing aspect, an appropriate amount of water is discharged by restricting the water discharging according to the height of the specific site of the following vehicle, more specifically, by restricting it if the specific site of the vehicle is low.

In the foregoing aspect, the specific site may be a roof.

According to this construction, an appropriate amount of water is discharged based on the vehicle height. Specifically, if a mobile unit has a great height (vehicle height), the range where the reaching of water fragments is allowed is considered to be correspondingly large, and a corresponding control of water discharging is possible.

In the foregoing aspect, the height of the specific site may be height of the sight line of a driver of the following mobile unit.

According to this construction, because the reference in height is the height of the sight line, the water discharging can be performed while the reaching of water to the driver of a following vehicle is restrained.

In the foregoing aspect, the follower recognizing means may estimate a type of the following mobile unit, and the drain controlling means may control the amount of water discharged according to the type of the following mobile unit.

In this construction, the type of the following mobile unit may be estimated by measuring a width of the mobile unit.

In the foregoing aspect, the follower recognizing means may estimate a model of the following mobile unit, and the drain controlling means may control the amount of water discharged according to the model of the following mobile unit.

This construction makes it possible to perform a control of the water discharging corresponding to the model of the following mobile unit.

In the foregoing construction, if the model of the following mobile unit is a two-wheeler, the drain controlling means may control the amount of water discharged less than if the model of the following mobile unit is a roofed four-wheel motor vehicle.

In the foregoing construction, the drain controlling means may prohibit the water discharging if the model of the following mobile unit is a two-wheeler.

According to this construction, in the case where the following mobile unit is a two-wheeler, the reaching of water to the mobile unit can be restrained.

In the foregoing construction, if the model of the following mobile unit is an open-top car, the drain controlling means may make the amount of water discharged less than if the model of the following mobile unit is a roofed four-wheel motor vehicle.

In the foregoing construction, the drain controlling means may prohibit the water discharging if the model of the following mobile unit is an open-top car.

According to the foregoing construction, in the case where the following mobile unit is an open-top car, the reaching of water fragments can be appropriately restrained.

In the foregoing construction, the follower recognizing means may measure an inter-vehicle distance between the following mobile unit and a host vehicle, and the drain controlling means may increase the amount of water discharged if the measured inter-vehicle distance is larger.

The vehicle of the foregoing aspect may further include means for measuring speed of the host vehicle. The drain controlling means may decrease the amount of water discharged if the measured speed is higher.

In the foregoing aspect, the drain controlling means may control the amount of water discharged from the fuel cell by controlling at least one of amount of a reaction off-gas discharged, amount of air supplied to the fuel cell, and amount of electricity generated by the fuel cell.

A second aspect of the invention relates to a control method for a fuel cell-equipped vehicle. In the control method, a following mobile unit is recognized, and discharging amount of water produced along with electricity generation of the fuel cell is controlled according to the result of recognition of the following mobile unit.

A third aspect of the invention relates to a fuel cell-equipped vehicle that includes: a fuel cell; a drain portion that discharges water produced along with electricity generation of the fuel cell; a follower recognizing portion that recognizes a following mobile unit; and a drain controlling portion that controls the amount of water discharged according to the result of recognition of the following mobile unit.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
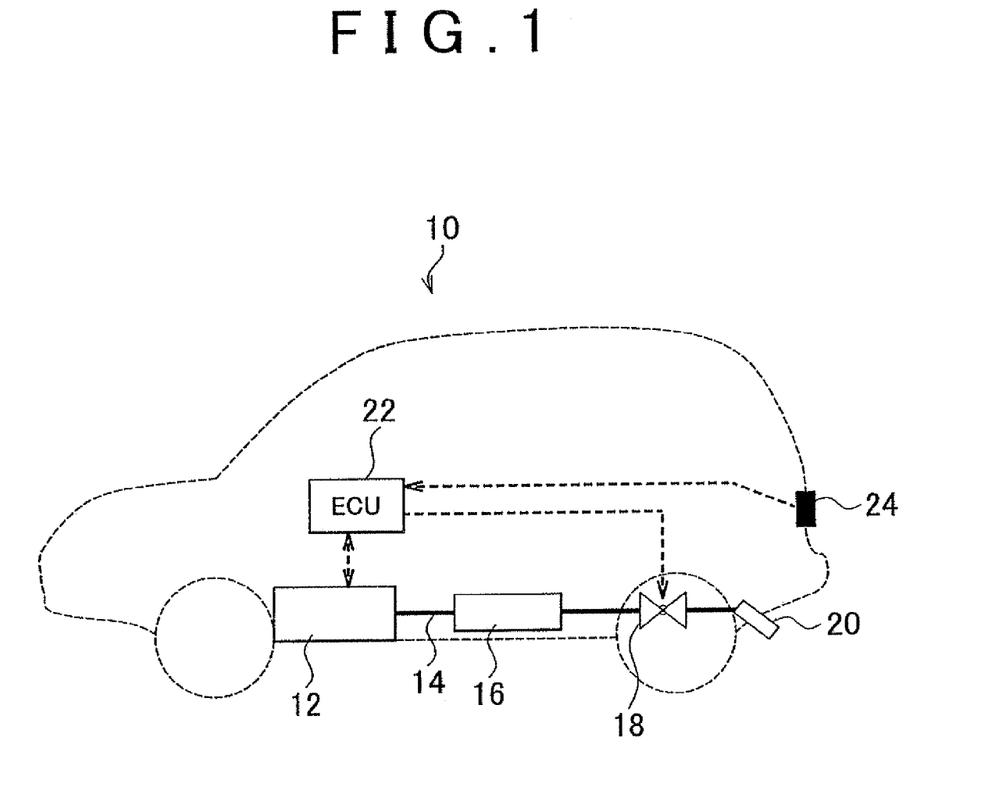
FIG. 1 is a diagram showing a construction of a first embodiment.

FIG. 1 is a simplified diagram showing a construction of a fuel cell-equipped vehicle 10 of a first embodiment. As shown in FIG. 1, the fuel cell vehicle 10 is equipped with a fuel cell 12. A drain channel 14 (shown in bold lines) is connected to the fuel cell 12. The drain channel 14 is provided with a water storage tank 16 and a drain control valve 18. An end portion of the drain channel 14 is formed as a water discharge opening 20. The water storage tank 16 is able to temporarily store water produced by the fuel cell 12. The fuel cell 12 is supplied with air (oxygen) and hydrogen to perform electricity generation, and produces water along with the electricity generation.

The water produced by the fuel cell 12 is separated from exhaust gas by a gas-liquid separator (not shown), and passes through the drain channel 14, and is stored in the water storage tank 16. The stored water is used to humidify the air that is supplied to the fuel cell 12, and the surplus water is released from the water discharge opening 20. Because the water storage tank 16 is provided, the produced water can be stored in the water storage tank 16 when the water discharging is interrupted or restrained. Therefore, even when the water discharging is interrupted or restrained, electricity generation can be continued. In addition, the operations of the fuel cell 12 and the drain control valve 18 are controlled by an ECU 22.

The fuel cell vehicle 10 also has a following vehicle monitor 24. The monitor 24 is connected to a camera, and acquires information regarding a mobile unit that follows the vehicle 10. Concretely, the inter-vehicle distance to a following mobile unit and images thereof are acquired.

Figure 2:
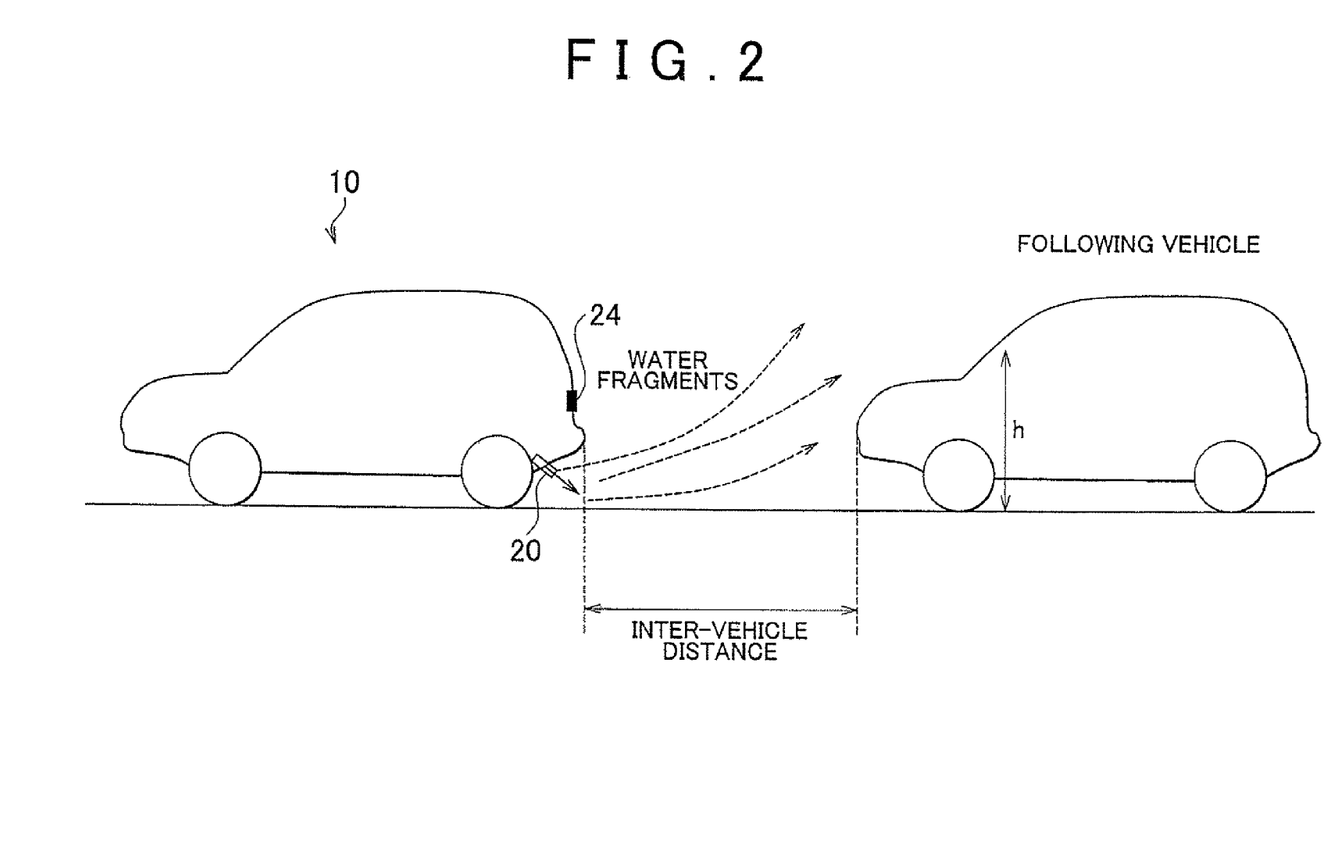
FIG. 2 is a diagram showing an example of application of the first embodiment.

FIG. 2 is a diagram showing an example of application of the fuel cell vehicle 10 of the first embodiment. Water fragments discharged from the water discharge opening 20 are blown up by vehicle travel wind or the like, and may sometimes be flown up higher than the water discharge opening 20. After that, water droplets fall due to the gravity. Therefore, when there is a following mobile unit, water fragments reaching the following mobile unit becomes a problem.

However, because mobile units are generally designed so as to be able to run even in a rain, water fragments landing on a mobile unit itself is allowable. However, if water lands on a windshield (which may be called a windscreen) and, in particular, on a portion thereof that corresponds to the height of a driver's sight line, the water on the windshield will possibly impede the driver from driving the vehicle or displease the driver. Therefore, less occurrence of such water landing is preferable. Besides, when it is not rainy, drivers do not anticipate water landing on the windshield, and it may possibly take some time before the water interfering with the field of driver's vision is cleared off by a windshield wiper or the like. In other words, the water landing on a portion below the height of the sight line is allowable to a certain degree. The height of the sight line herein refers to the height of eyes of an ordinary physical build driver sitting in a driver's seat of a following mobile unit.

The likelihood of water fragments reaching a driver's sight line differs depending on the height (h) of the sight line; specifically, the lower the height of the sight line, the more likely the water fragments reach the driver's sight line.

Figure 3:
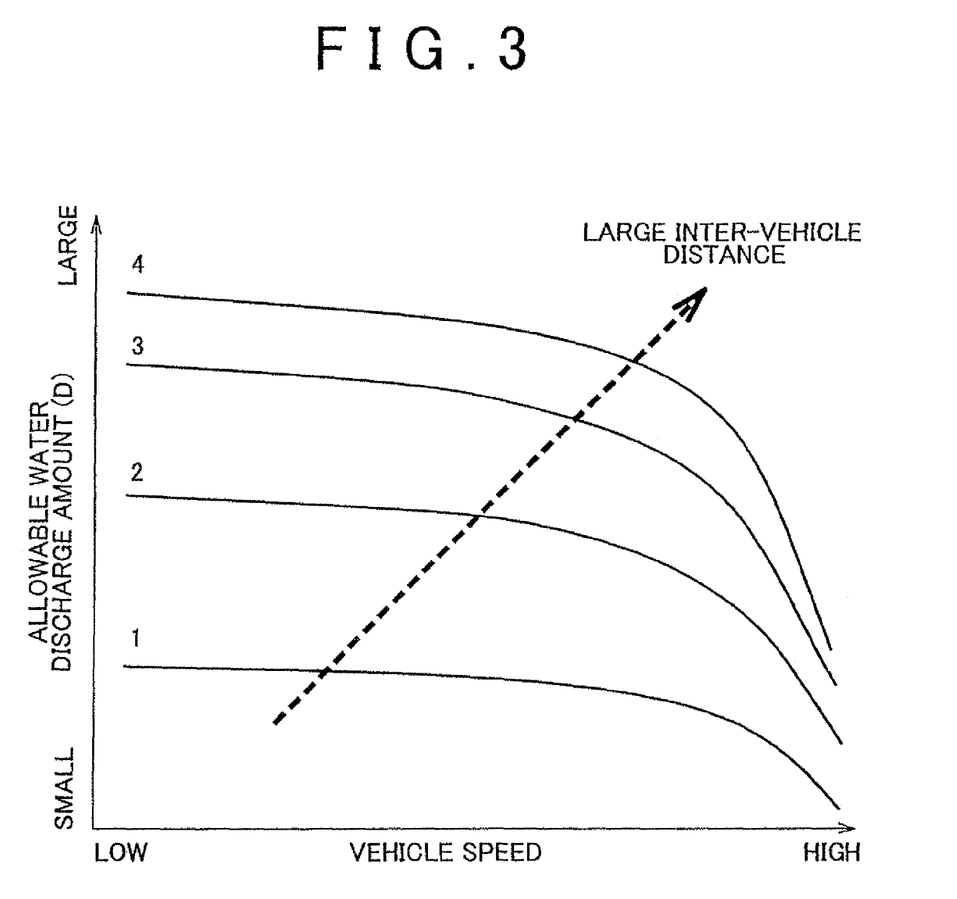
FIG. 3 is a map for use in a control of the first embodiment.

FIG. 3 shows an example of a map in which the vehicle speed and the allowable amount of water discharged (D) are associated with each other at a predetermined inter-vehicle distance. This map is for use in the control of the first embodiment described below. The allowable amount of water discharged herein is the amount of water that the fuel cell vehicle 10 can discharge in relation with a following mobile unit. In this embodiment, the allowable amount of water discharged is estimated by assuming a four-wheel motor vehicle with a windshield and a roof as a following mobile unit. In FIG. 3, curve 1 is a graph in the case of a short inter-vehicle distance, and the inter-vehicle distance becomes longer toward curve 4. The longer the inter-vehicle distance, the larger the allowable amount of water can be discharged. In addition, the shorter the inter-vehicle distance, the smaller the allowable amount of water can be discharged. This is because the shorter the inter-vehicle distance, the more likely the discharged water fragments are to reach the following vehicle. Besides, the slower the vehicle speed, the larger the allowable amount of water can be discharged. The faster the vehicle speed, the smaller the allowable amount of water can be discharged. This is because the faster the vehicle speed, the stronger the travel wind becomes, so that the water fragments are more likely to reach the following vehicle. In this map, the height of the sight line in the following mobile unit is set at a predetermined value. This map can be obtained through experiments beforehand, and in this embodiment is stored in a memory in the ECU 22.

Figure 4:
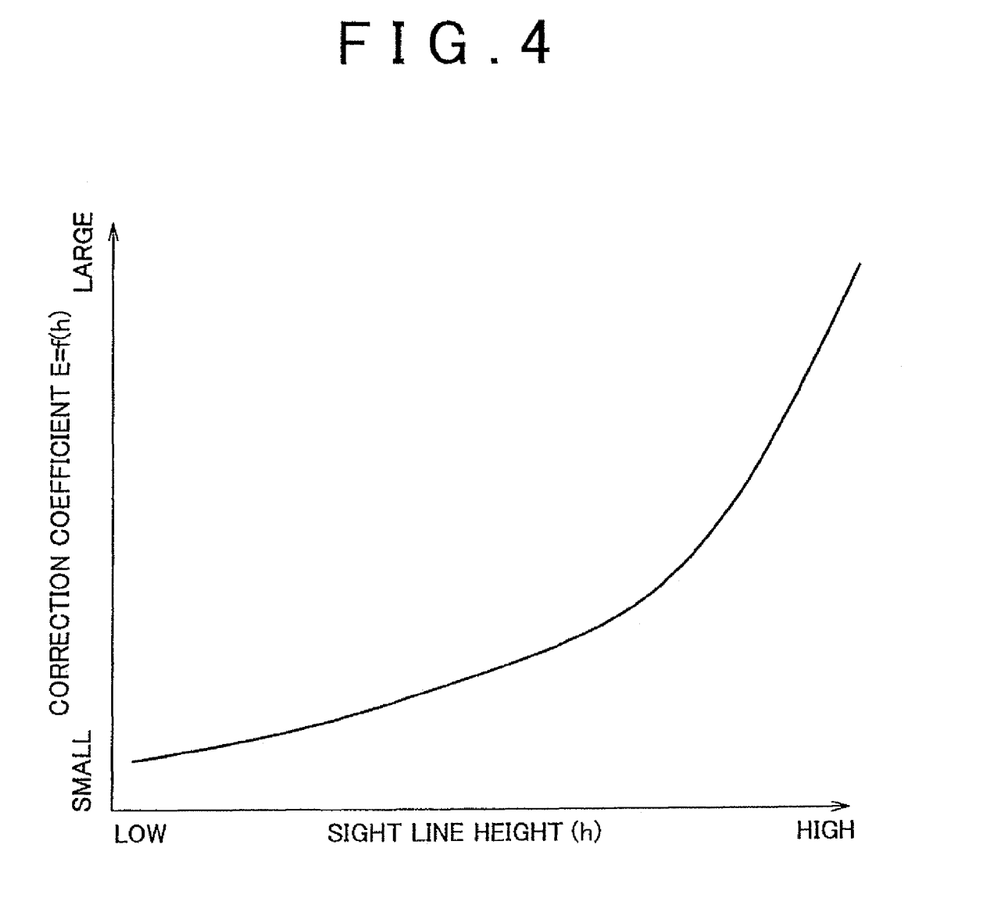
FIG. 4 is a map for use in the control of the first embodiment.

FIG. 4 shows a map in which the vehicle height (h) of a following vehicle and a correction coefficient (E) are associated with each other. As described above, in relation with the following vehicle, the water that reaches the windshield or the like at the height of the sight line in particular becomes a problem, and the likelihood of water reaching that height differs depending on the height of the sight line. Therefore, the allowable amount of water discharged (D) shown in FIG. 3 needs to be corrected by the vehicle height of the following vehicle. The correction coefficient (E) herein is a coefficient used for the correction, and is a function dependent on the vehicle height (h).

The correction is performed by the following equation (1).

$$D(\text{post-correction}) = D(\text{pre-correction}) \times E \quad (1)$$

As shown in FIG. 4, the value of the correction coefficient becomes larger the higher the vehicle height is. Therefore, the value of the allowable amount of water discharged also becomes larger the higher the vehicle height is. The map shown in FIG. 4 can also be obtained through experiments beforehand, and is stored in a memory in the ECU 22.

Figure 5:
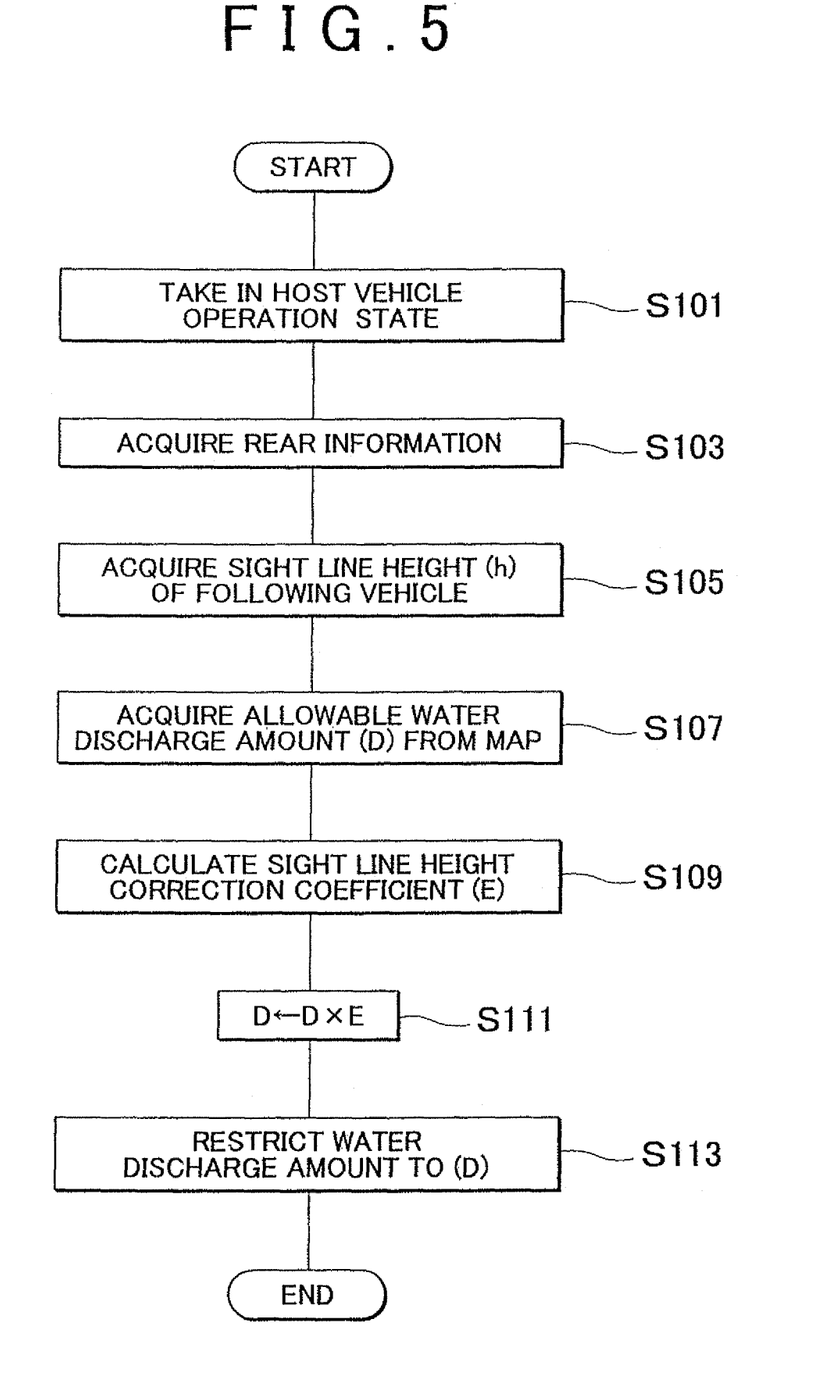
FIG. 5 is a flowchart showing a process of the first embodiment.

FIG. 5 is a flowchart showing a control of the first embodiment. ECU 22 executes the process shown in FIG. 5 in a predetermined time interval. Firstly, the ECU 22 takes in the operation state of the host vehicle, concretely, the vehicle speed (S101).

Next, the ECU 22 acquires the rear information (S103). Concretely, the ECU 22 acquires the inter-vehicle distance between the following vehicle and the host vehicle and an image of the following vehicle. Referring to the image and a database of vehicle information, the ECU 22 identifies the type of the following vehicle and acquires the height of the sight line (h) of the identified vehicle type from a map in which the vehicle types and the heights of the sight line are associated with each other (S105). Because the ECU 22 identifies the vehicle type, and estimates the height of the sight line, the height of the sight line can be accurately estimated. Instead of the vehicle type, the model of the following vehicle may be defined. In that case, the height of the sight line can be more accurately estimated according to the vehicle model.

Next, the ECU 22 acquires an allowable amount of water discharged (D) from the inter-vehicle distance and the vehicle speed using a map (see FIG. 3) (S107). Subsequently, the ECU 22 calculates a correction coefficient (E) from the height of the sight line (h) using a map (see FIG. 4) (S109). Then, using the correction coefficient (E), the ECU 22 corrects the allowable amount of water discharged (D) by the equation (1) (S111). The ECU 22 sets the corrected allowable amount of water discharged as an upper limit of the amount of water can be discharged, and designates such a degree of opening of the drain control valve 18 that water can be discharged in the range up to the upper limit, and then performs discharging of water (S113).

Incidentally, the ECU 22 executing steps S103 and S105 in this embodiment may correspond to follower recognition means in the embodiment and the ECU 22 executing steps S107, S109, S111 and S113 may correspond to drain control means in the embodiment.

According to the first embodiment, because the amount of water discharged is controlled based on the height of the sight line of the following mobile unit, which is one of external characteristics thereof, it is possible to perform discharge of water while avoiding the water landing within the field of vision of the driver of the following mobile unit. That is, it is possible to deal with the produced water while restraining water landing on the portion of the following vehicle in which the reaching of the water particularly needs to be restrained.

Although in the first embodiment, the ECU 22 identifies the type or model of the following mobile unit to acquire the height of the sight line of the driver, this is not restrictive. The ECU 22 may estimate the height of the sight line directly from an acquired image. It is also permissible to recognize the face of the driver of the following mobile unit by image analysis and deduce the height of the sight line. The height of the sight line may also be estimated from the vehicle height (the height of the roof) or the height of the windshield. Because the vehicle height and the height of the windshield generally correspond to the height of the sight line of drivers, the estimation of the height of the sight line in the foregoing manner is possible. The height of the windshield may be presented with reference to a center portion of the windshield or may also be represented with reference to an uppermost portion or a lowermost portion thereof. Besides, as the reference in height, it is permissible to directly use the vehicle height or the height of the windshield instead of the height of the sight line.

Besides, although the rear information is acquired via the following vehicle monitor 24, that is, image pickup means, this is not restrictive. Any means or like is sufficient if a characteristic of the shape of the following vehicle is estimated. For example, a microwave may be radiated, and its reflection may be used to determine a shape characteristic or the like. It is also permissible to communicate with the following mobile unit in order to specifically determine the type of the vehicle or the height thereof.

Besides, although in the first embodiment, the ECU 22 controls only the amount of water discharged with regard to the water stored in the water storage tank 16, this is not restrictive. The fuel cell vehicle 10 has a gas discharge opening for discharging the reaction off-gas to the outside, and water fragments are sometimes discharged through the gas discharge opening as well. The ECU 22 may control the amount of water fragments discharged through the gas discharge opening, corresponding to the height of the sight line of the following vehicle. In order to restrict the water discharging, it suffices that the ECU 22 restricts the supply of air. Generally, if the supply of air is restricted, the amount of exhaust gas also decreases, and the amount of water discharged decreases as well. At the same time, the ECU 22 may also restrict the electricity generation. Generally, if the electricity generation is restricted, the amount of water produced also decreases. In addition, in the case where the electricity generation is restricted, it is preferable that the vehicle be equipped with an electric storage device such as a battery or the like, from the viewpoint of securing the motive power for the vehicle.

Figure 6:
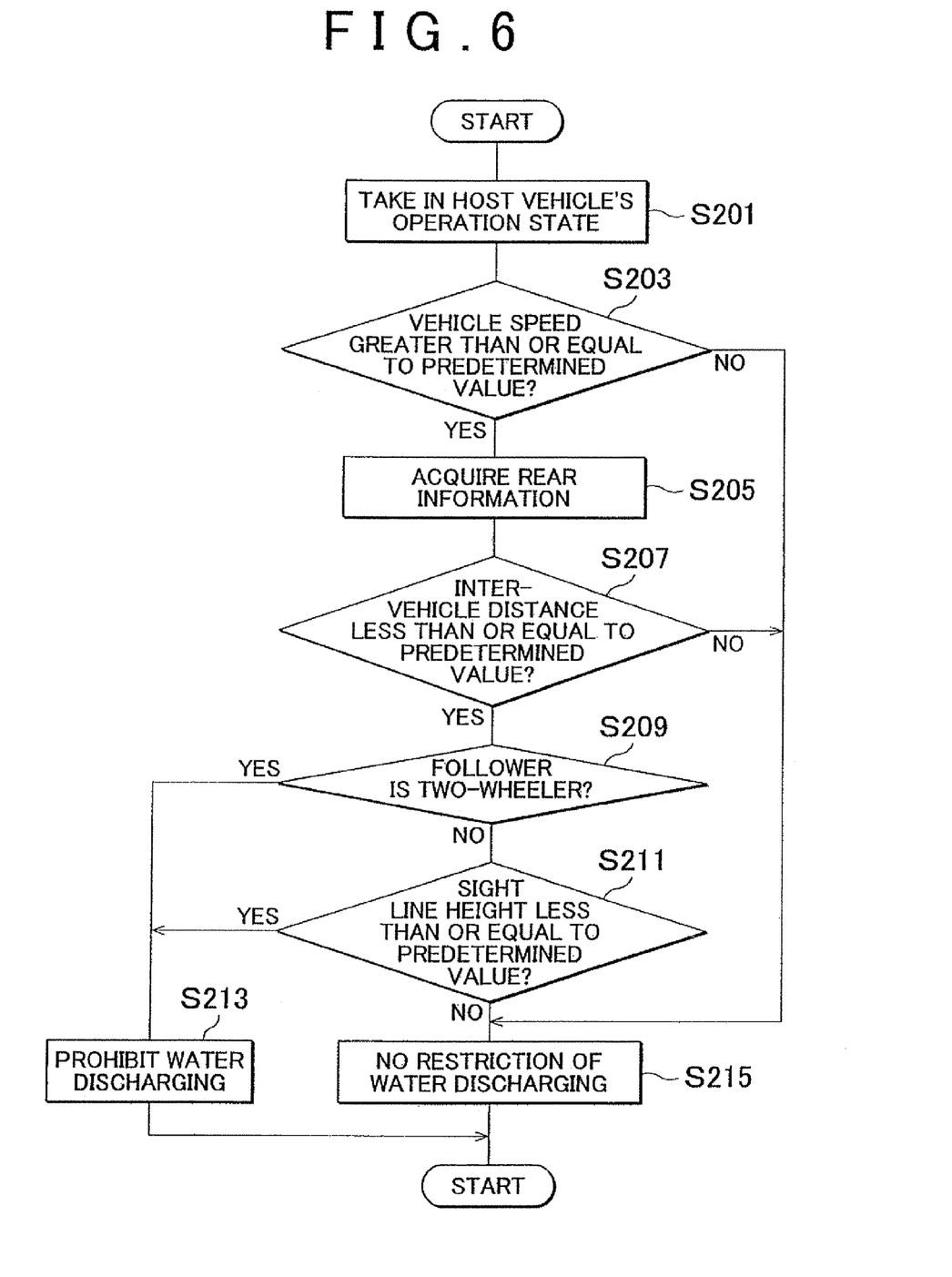
FIG. 6 is a flowchart showing a process of a second embodiment.

FIG. 6 is a flowchart showing a control in a second embodiment. The construction of the second embodiment is substantially the same as that of the first embodiment shown in FIG. 1.

In the control of this embodiment, the ECU 22 firstly takes in the state of operation of the host vehicle, concretely, the vehicle speed (S201).

Next, the ECU 22 determines whether or not the vehicle speed is greater than or equal to a predetermined value (S203). If the vehicle speed is less than the predetermined value (NO in S203), the ECU 22 does not restrict the discharge of water (S215). This is because if the vehicle speed is less than the predetermined value, the travel wind is weak, so that water fragments are scarcely blown up.

If the vehicle speed is greater than or equal to the predetermined value (YES in S203), the ECU 22 acquires the rear information (S205). The information acquired in this step is the inter-vehicle distance to a following mobile unit and an image of the following mobile unit, as in the first embodiment. Next, the ECU 22 determines whether the acquired inter-vehicle distance is less than or equal to a predetermined value (S207). If the inter-vehicle distance is greater than the predetermined value (NO in S207), the ECU 22 does not perform restriction of the water discharging (S215). This is because the inter-vehicle distance being greater than the predetermined value means that there is no following mobile unit exists within the range where the water from the host vehicle can possibly reach to, so that there is no need for the foregoing restriction.

If the inter-vehicle distance is less than or equal to the predetermined value (YES in S203), the ECU 22 analyzes the acquired image of the following mobile unit and determines whether the type of the following mobile unit is a two-wheeler (S209). This determination is performed by analyzing the acquired image. Specifically, the ECU 22 extracts characteristic portions from the image and refers to the database of the ECU 22 in order to determine whether the following mobile unit is a two-wheeler. If the following mobile unit is a two-wheeler (YES in S209), the ECU 22 prohibits the water discharging (S213). In the case of a two-wheeler, which often does not have a windshield, there is a need to further restrain the water fragments reaching. Besides, it is often the case that the driver (or rider) of a two-wheeler is exposed. Therefore, in the case of a two-wheeler, there is also a need to avoid water fragments reaching the driver's body. Therefore, it is preferable to restrain the water reaching positions lower than the height of the sight line. To that end, the ECU 22 prohibits the water discharging in the case where the following mobile unit is a two-wheeler (YES in S209).

If the following mobile unit is not a two-wheeler (NO in S209), the ECU 22 determines whether the height of the sight line of the driver of the following mobile unit is less than or equal to a predetermined value (S211). The height of the sight line is estimated as described above in conjunction with the first embodiment. If the height of the sight line of the following mobile unit is less than or equal to the predetermined value (YES in S211), the ECU 22 prohibits the water discharging (S213). On the other hand, if the height of the sight line is greater than the predetermined value (NO in S211), the ECU 22 does not restrict the water discharging (S215).

Incidentally, the ECU 22 executing steps S205, S209 and S211 in this embodiment may correspond to follower recognition means in this embodiment, and the ECU 22 executing steps S213 and S215 may correspond to drain control means in this embodiment.

According to the second embodiment, in the case where the following mobile unit is a two-wheeler, the water discharging is prohibited, so that inconveniences or the like to two-wheeler drivers can be avoided. Besides, in the case where the vehicle speed is slower than the predetermined value or the inter-vehicle distance is longer than the predetermined value, the prohibition of the water discharging is lifted. Therefore, the water discharging can be appropriately performed in the case where the water discharging is possible.

In the second embodiment, whether the type of the following mobile unit is a two-wheeler is determined with reference to the database of the ECU 22, this is not restrictive, that is, it is sufficient if it can be estimated whether the following mobile unit is a two-wheeler. For example, it may be estimated that a following mobile unit is a two-wheeler, the total width of the following mobile unit from the acquired image is less than or equal to a predetermined value.

Besides, although in the second embodiment, the ECU 22 prohibits the water discharging in the case where the following mobile unit is a two-wheeler, this is not restrictive. It suffices to perform a restriction of the water discharging, that is appropriate for the type of a following mobile unit in the case where a special restriction of water discharging is needed corresponding to the type of the following mobile unit. For example, in the case where the following mobile unit is an open-top car, which does not have a roof, it is preferable to make the water discharging less than in the case where the following mobile unit is a vehicle with a roof, in order to restrain water fragments from reaching the driver or the cabin of the open-top car. To that end, in the case where the following mobile unit is an open-top car, the ECU 22 may prohibit the water discharging. The determination as to whether the following mobile unit is an open-top car can be performed through the identification of the type of the following mobile unit accomplished by checking the acquired image against the database of ECU 22. Whether the following mobile unit is an open-top car may also be directly determined, for example, by checking the presence/absence of a roof in an image. In the case where the model of the following vehicle, instead of the type thereof, is defined, it is possible to discriminate whether the following mobile unit is an open-top car according to the model.

In the second embodiment, it is also permissible to restrain the amount of water discharged instead of prohibiting the water discharging. In that case, it suffices to prepare a map of the allowable amount of water discharged that corresponds to the water fragments reaching a two-wheeler or an open-top car. In the case of a two-wheeler, it is preferable that the water landing on positions lower than the height of the sight line be also small, in order to avoid water reaching the two-wheeler driver's body. To that end, when the following mobile unit is a two-wheeler, it is preferable to make the allowable amount of water discharged less than when the following mobile unit is an open-top car.

Figure 7:
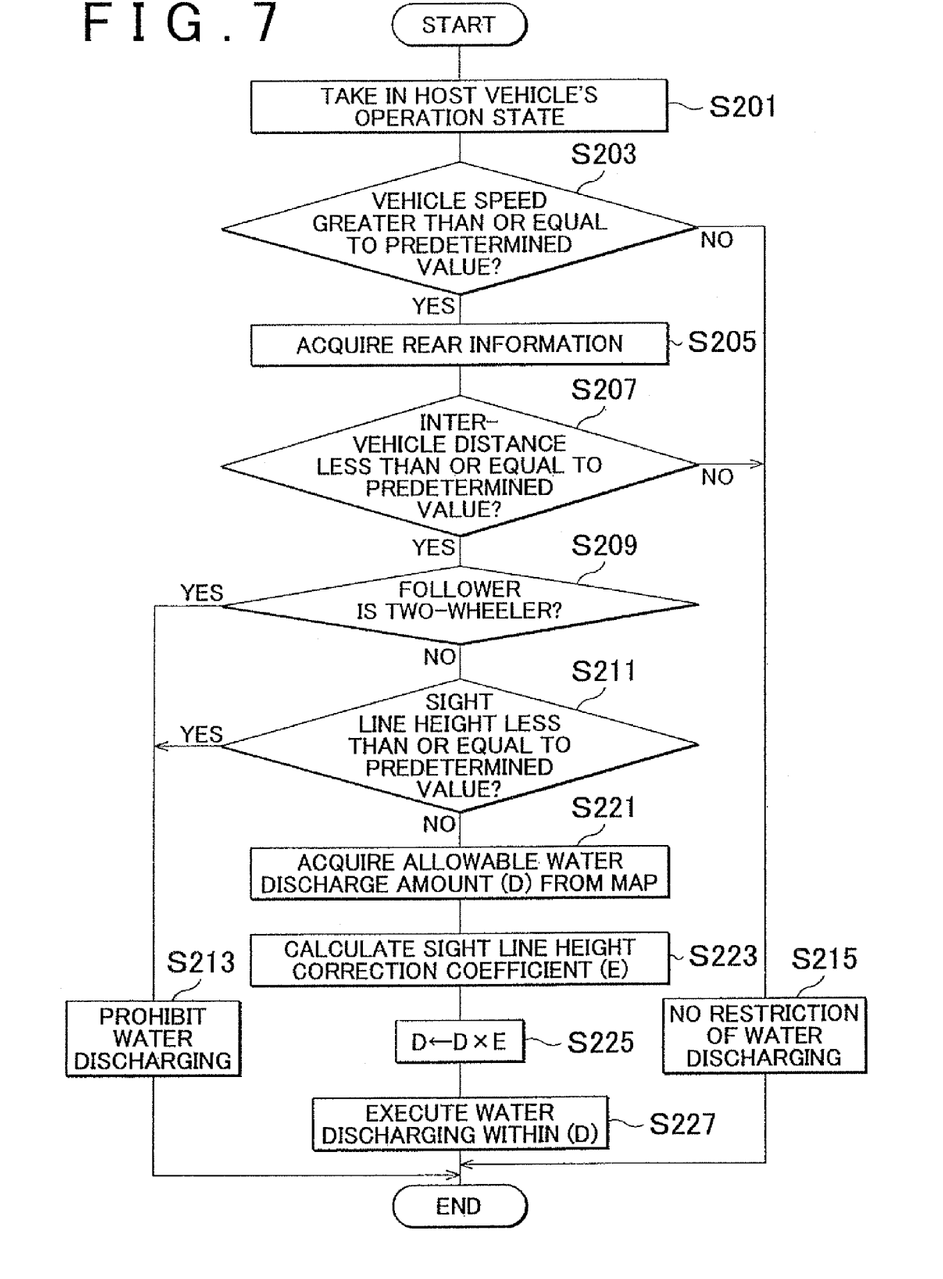
FIG. 7 is a flowchart showing a process of a modification of the second embodiment.

FIG. 7 is a flowchart showing a control of a modification of the second embodiment. This modification is a combination of the control of the first embodiment and the control of the second embodiment. Portions where the same control is performed as those in the second embodiment are presented with the same reference characters. In this modification, the ECU 22 firstly performs the same process as the process up to S11 in the second embodiment. If it is determined in S211 that the height of the sight line is greater than the predetermined value (NO in S211), the ECU 22 performs the same process as the process of S107 to S113 (S211, S223, S225 and S227).

According to this modification, it is possible to deal with the produced water while restraining reaching water to portions of the following vehicle where the reaching of the water fragments particularly needs to be restrained. Besides, inconveniences or the like to two-wheeler drivers can also be avoided. Besides, in the case where the water discharging is possible, the restriction of water discharging and the prohibition of water discharging are lifted. Therefore, water discharging can be performed when the water discharging is possible.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:
1. A fuel cell-equipped vehicle comprising:
a fuel cell;
a drain portion that discharges water produced along with electricity generation of the fuel cell;
a follower recognizing portion that recognizes a following mobile unit; and
a drain controlling portion that controls the amount of water discharged according to the result of recognition of the following mobile unit,
wherein the follower recognizing portion estimates a height of a specific site of the following mobile unit, wherein the drain controlling portion decreases the amount of water discharged as the lower the height of the specific site is.

2. The fuel cell-equipped vehicle according to claim 1, wherein the drain controlling portion prohibits the water discharging if the height of the specific site is less than or equal to a predetermined value.

3. The fuel cell-equipped vehicle according to claim 1, wherein the drain controlling portion discontinues the control of the amount of water discharged if the height of the specific site is greater than or equal to a predetermined value.

4. The fuel cell-equipped vehicle according to claim 1, wherein the specific site is a roof of the following mobile unit.

5. The fuel cell-equipped vehicle according to claim 1, wherein the height of the specific site is height of the sight line of a driver of the following mobile unit.

6. The fuel cell-equipped vehicle according to claim 1, wherein:
the follower recognizing portion estimates a type of the following mobile unit; and
the drain controlling portion controls the amount of water discharged according to the type of the following mobile unit.

7. The fuel cell-equipped vehicle according to claim 6, wherein the type of the following mobile unit is estimated by measuring a width of the mobile unit.

8. The fuel cell-equipped vehicle according to 1, wherein:
the follower recognizing portion estimates a model of the following mobile unit; and
the drain controlling portion controls the amount of water discharged according to the model of the following mobile unit.

9. The fuel cell-equipped vehicle according to claim 6, wherein if the type of the following model unit is a two-wheeler, the drain controlling portion controls the amount of water discharged less than if the model of the following mobile unit is a roofed four-wheel motor vehicle.

10. The fuel cell-equipped vehicle according to claim 6, wherein the drain controlling portion prohibits the water discharging if the type of the following model unit is a two-wheeler.

11. The fuel cell-equipped vehicle according to claim 6, wherein if the model of the following mobile unit is an open-top car, the drain controlling portion makes the amount of water discharged less than if the type of the following model unit is a roofed four-wheel motor vehicle.

12. The fuel cell-equipped vehicle according to claim 6, wherein the drain controlling portion prohibits the water discharging if the type of the following model unit is an open-top car.

13. The fuel cell-equipped vehicle according to claim 1, wherein the follower recognizing portion measures an inter-vehicle distance between the following mobile unit and a host vehicle, and the drain controlling portion increases the amount of water discharged if the measured inter-vehicle distance is larger.

14. The fuel cell-equipped vehicle according to claim 1, further comprising a speed measuring portion that measures speed of the host vehicle,
wherein the drain controlling portion decreases the amount of water discharged if the measured speed is higher.

15. The fuel cell-equipped vehicle according to claim 1, wherein the drain controlling portion controls the amount of water discharged from the fuel cell by controlling at least one of amount of a reaction off-gas discharged, amount of air supplied to the fuel cell, and amount of electricity generated by the fuel cell.

16. The fuel cell-equipped vehicle according to claim 8, wherein if the model of the following mobile unit is a two-wheeler, the drain controlling portion controls the amount of water discharged less than if the model of the following mobile unit is a roofed four-wheel motor vehicle.

17. The fuel cell-equipped vehicle according to claim 8, wherein the drain controlling portion prohibits the water discharging if the model of the following mobile unit is a two-wheeler.

18. The fuel cell-equipped vehicle according to claim 8, wherein if the model of the following mobile unit is an open-top car, the drain controlling portion makes the amount of water discharged less than if the model of the following mobile unit is a roofed four-wheel motor vehicle.

19. The fuel cell-equipped vehicle according to claim 8, wherein the drain controlling portion prohibits the water discharging if the model of the following mobile unit is an open-top car.

* * * * *